July 12, 1960 P. RICHARDS 2,944,633
LOAD ELEVATING APPARATUS
Filed Sept. 30, 1957 5 Sheets-Sheet 1

PHILIP RICHARDS
INVENTOR
HUEBNER, BEEHLER & WORREL
ATTORNEYS

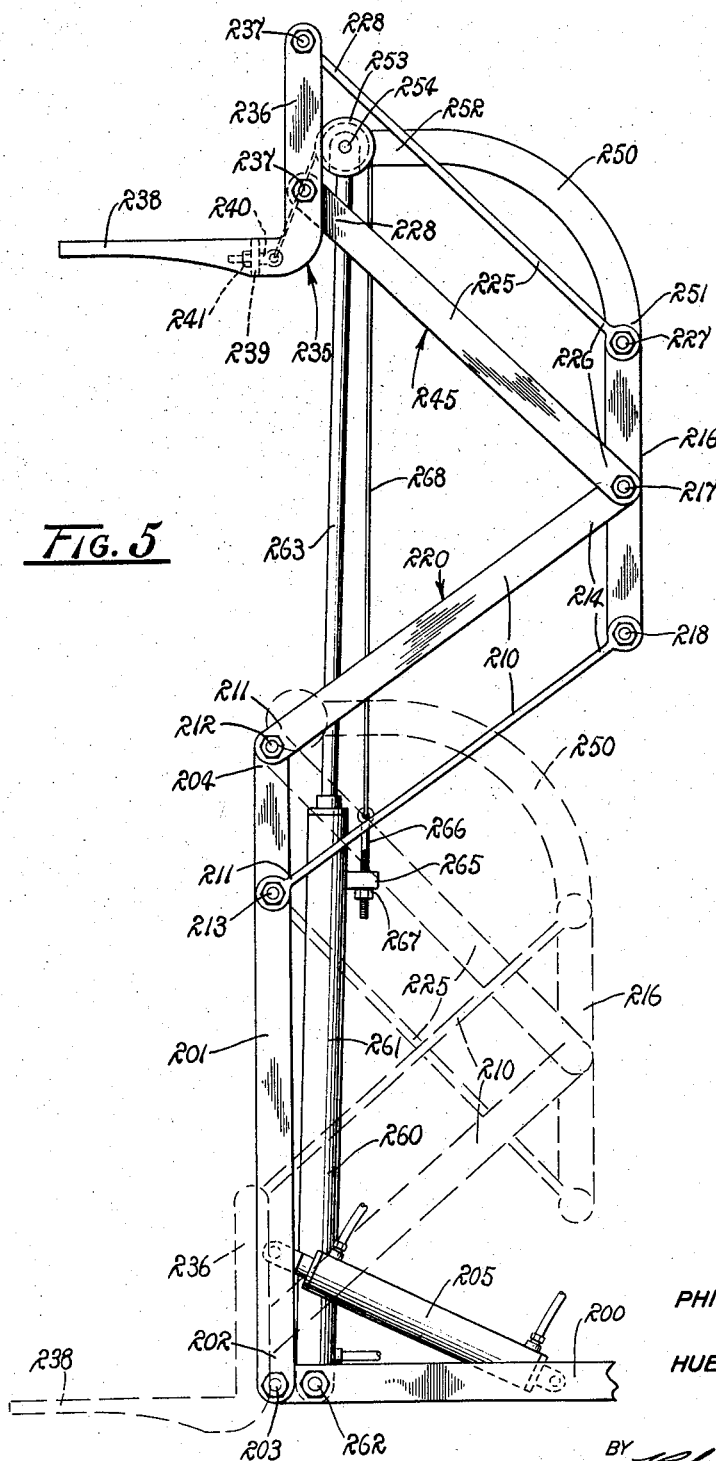

United States Patent Office 2,944,633
Patented July 12, 1960

2,944,633

LOAD ELEVATING APPARATUS

Philip Richards, 5560 Columbia Drive N., Fresno, Calif.

Filed Sept. 30, 1957, Ser. No. 687,018

10 Claims. (Cl. 187—9)

The present invention relates to a load elevating apparatus and more particularly to such an apparatus for raising and lowering loads along substantially straight paths. As will subsequently become more fully apparent, the invention has special advantage in enabling the lifting of loads to increased heights, in relation to the over-all height of the apparatus when in collapsed or retracted condition, while maintaining the loads in constant predetermined attitudes.

Industrial trucks for lifting, carrying, elevating, and otherwise handling loads, have long been known. Conventionally, they have included wheeled vehicles mounting a pair of endwardly extended lift forks for elevationally controlled movement. A common means for mounting the forks for this movement has included a pair of erect slide channel members supported in opposed, upright, spaced parallel relation on the vehicle, and a movable frame to which the forks are connected including slide bars, having antifriction rollers, telescopically mounted in the channel members.

Usually, hydraulically powered rams slide the movable frame upwardly and downwardly relative to the channel members. The channel members constrain the forks to rectilinear movement.

It is necessary to make the telescoping slide bars and channel members of conventional lifting apparatus of this nature excessively heavy because as the slide bars are raised, the load on the forks exercises a continually increasing binding or shearing force on the slide bars with respect to the channel members. For this reason also, the slide bars and channel members are subject to excessive and rapid wear. Further, the channel members are expensive to repair and/or to replace because of the material costs and labor involved. Thus, conventional lifting apparatus of the character described must utilize heavier and more expensive structural elements than desired in order to withstand the shear stresses involved. To achieve requisite sturdiness, it has become generally accepted that the structure must be such that it becomes cumbersome as well as costly to produce and to maintain.

Another disadvantage resides in the inherent limitations to the amount of extension that can be achieved by telescopically associated members. For example, the maximum extension attainable is always substantially less than the aggregate lengths of the elements which are telescopically associated. Because of this, conventional lift trucks employing a pair of slide bars mounted in a pair of channel members have a maximum upward extension substantially less than twice their height when retracted.

Accordingly, it is an object of the present invention to provide an improved elevating apparatus for raising and lowering loads in a substantially straight path while maintaining the load in a predetermined attitude.

Another object is to provide an elevating apparatus capable of lifting loads to elevations more than twice the height of such apparatus when fully retracted.

Another object is to provide a lightweight lifting apparatus of the character described.

Another object is to provide a lifting apparatus which is durable and of high strength in relation to its weight, as compared with known devices of the type.

Another object is to minimize friction and resultant wear in elevating apparatus such as fork trucks and the like.

Another object is to avoid the binding and shearing forces normally incurred in conventional fork trucks which use telescoping slides for lifting load bearing forks.

Another object is to facilitate the repair and/or replacement of wearable parts of load elevating apparatus.

Another object is to provide elevating apparatus of the character described which is particularly suited to mounting on vehicles.

Other objects are to provide a lifting apparatus which is economical to construct and to operate, dependable in operation, adapted to handle a variety of loads, and which is highly effective in accomplishing its intended purposes.

These, together with other objects, will become more fully apparent upon reference to the following description.

In the drawings:

Fig. 5 is a side elevation of a second form of the elevating apparatus of the present invention showing a collapsed position in dashed lines and an upwardly extended position in full lines.

Figure 1:
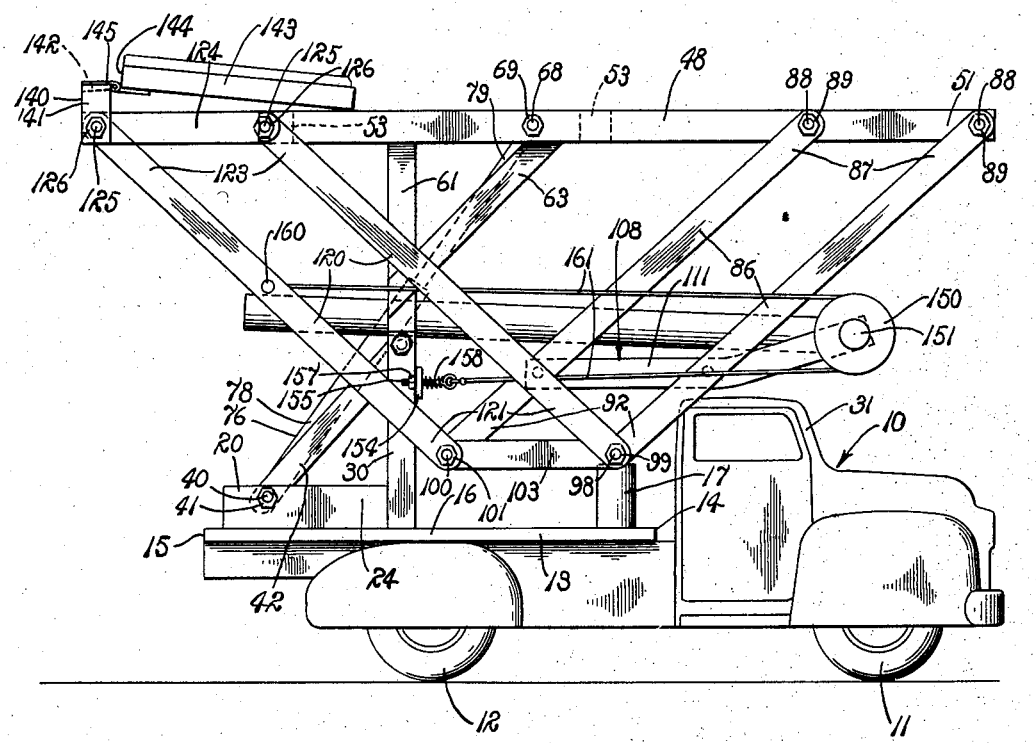
Fig. 1 is a side elevation of an elevating apparatus embodying the principles of the present invention in collapsed transporting position and mounted on a truck for portability.

Referring in particular to the drawings, a truck is indicated in Fig. 1 by the numeral 10. The truck typifies one of many vehicles with which the invention may be used for mobility. For example, the invention can be incorporated on an industrial truck, tractor, railway car or the like. It will also be apparent that the apparatus has many advantageous applications to uses which do not require mobility. In such operational environments, it may be mounted on any suitable foundation. The truck illustrated provides a pair of spaced front wheels 11, a pair of spaced rear wheels 12, and a substantially horizontal load supporting bed 13 having a front edge 14, a rear edge 15, and a pair of longitudinal side edges 16. A support block 17 is mounted on the bed adjacent to its front edge.

Base brackets 20 provide horizontal flanges 21 rested on the bed 13 of the truck 10 in transversely spaced relation and secured thereto, as by welding. The brackets also include transversely spaced, parallel flanges 24 upstanding from the horizontal flanges and substantially perpendicular thereto.

Vertical posts 30 provide lower ends rigidly secured, as by welding, to the vertical flanges 24 of the base brackets 20. The posts are rigidly upwardly extended from the brackets in transversely spaced, parallel relation and terminate just above the level of the cab 31 of the truck 10. An upper, elongated pivot rod 32 is extended transversely of the truck and has opposite ends mounted in the upper ends of the posts. Heads 33 are secured to the opposite ends of the pivot rods outwardly of the posts. Collars 34 are secured, as by welding, to the inside surfaces of the posts and are in circumscribing relation to the pivot rod at its outer ends.

An elongated lower pivot rod 40 is also transversely extended relative to the truck 10 and has opposite ends mounted rearwardly in the vertical flanges 24 of the base brackets 20. Heads 41 are secured to the lower pivot rod outwardly of the vertical flanges. The lower rod is thus in rearwardly downwardly spaced parallel relation to the upper rod. Rigid braces 42 provide lower ends fitted on the outer ends of the lower pivot rod adjacent to the vertical flanges 24 and upper ends rigidly secured to the collars 34.

A substantially rectangular mast 48 includes a pair of elongated, longitudinally extended, rigid members 49 having lower ends 50 and upwardly extended ends 51. A lower ground-engaging cross member 52 rigidly interconnects the lower ends of the longitudinal members, and intermediate cross members 53 rigidly interconnect the longitudinal members between their upper and lower ends. It will of course be evident that if desired the members 49 may terminate at or above the level of the bed 13 and the lower ends 50 and cross member 52 be omitted entirely.

An elongated sleeve 60 is journaled on the upper pivot rod 32 between the collars 34. Elongated support arms 61 provide inner ends rigidly connected to opposite ends of the sleeve adjacent to the collars and outer ends 62 radially outwardly extended from the sleeve in a substantially common plane and in the same direction. The outer ends of the support arms are individually rigidly connected to the longitudinal members 49 of the mast 48 between the intermediate cross members 53 so that the support arms are substantially perpendicular to the mast. Elongated struts 63 rigidly interconnect the inner ends of the support arms and the longitudinal mast members adjacent to an intermediate cross member.

Studs 68 are extended individually through the longitudinal mast members 49 transversely of the vehicle 10 and generally parallel with the upper and lower pivot rods 32 and 40. Heads 69 are secured to opposite ends of the studs, and a collar 70 is provided on each of the studs.

A pair of tilt control rams 76 is provided each including a lower tubular portion journaled on an end of the lower pivot rod 40, a cylinder 78 secured to its respective tubular portion and radially extended therefrom, and a piston rod 79 mounted in its respective cylinder for longitudinal reciprocal movement. The piston rods provide upper ends individually pivotally fitted on the studs 68 between the inwardly disposed heads 69 and the collars 70. Bushings 80 are interposed the tubular portions of the rams and the respectively adjacent braces 42, and an elongated tubular spacer 81 is fitted on the lower pivot rod between the tubular portions. As described thus far, it will be evident that when the tilt rams are extended, the mast 48 is elevationally pivoted on the upper pivot rod 32 into a substantially horizontal position. When the tilt rams are contracted, the mast is pivoted into a substantially vertical position with its lower end 50 extended downwardly from the rear edge 15 of the truck bed 13 so that the lower cross member 52 is in ground engagement.

Pairs of elongated, rigid, mounting links or side members 86 are provided on opposite sides of the mast 48 and have mast ends 87 individually pivotally connected in longitudinally spaced relation to the upper ends 51 of the longitudinal mast members 49. For this purpose, pivot pins 88 are extended through the upper ends of the longitudinal members and secured to the mounting links. Heads 89 are provided on both ends of the pins; washers 90 are interposed the inner heads and the mast; and spacing bosses 91 protrude outwardly from the longitudinal members between such members and the mounting links. It is to be noted that the links are thereby disposed outwardly of the mast in substantially parallel vertical planes, which planes are substantially coincident with the longitudinal side edges 16 of the truck 10. Further, it is to be noted that the mast ends of each pair of links are spaced substantially the same distance apart, that the pivot pins are parallel to each other and to the pivot rods 32 and 40, that the uppermost pivot pins are in coaxial alignment, and that the lowermost pivot pins are also in coaxial alignment. The mounting links further provide hinge ends 92, oppositely extended from the mast ends, and having outwardly disposed bosses 93.

An elongated, substantially cylindrical, upper hinge member 98 is transversely extended between the upper mounting links 86 of each pair of links and provides opposite ends rotatably extended through the hinge ends 92 of the mounting links. Heads 99 are provided on the outwardly extended ends of the hinge member. Further, a lower hinge member 100 is extended between the lower mounting links of each pair and through their hinge ends in substantially parallel relation to the upper hinge member. Likewise, heads 101 are connected to the outer ends of the lower hinge member. Upright rigid hinge connecting bars or intermediate end members 103 provide upper and lower ends respectively rigidly connected to the upper and lower hinge members adjacent to the hinge ends of the mounting links. The hinge connecting bars are thus in spaced parallel relation to each other and to the longitudinal members 49 of the mast 48.

An auxiliary support frame or bracket 108 includes an upper axle 109 parallel to the hinge member 98 and having opposite ends rotatably journaled in the upper mounting links 86 of each pair of links. Further, a lower axle 110 extends between the lower links 86 of each pair and has opposite ends rotatably journaled therein. The auxiliary frame also provides a pair of laterally spaced pulley mounting booms 111 rigidly transversely interconnecting the opposite ends of the upper and lower axles 109 and 110 but spaced inwardly of the pairs of mounting links. The booms are in substantially vertical positions parallel to the hinge connecting bars 103 and the mast members 49. A pair of laterally spaced ram connecting beams 112 also rigidly interconnect the axles intermediate their ends and extend upwardly in parallel relation to the booms. The beams and the booms all have rearwardly curved upper end portions.

Figure 4:
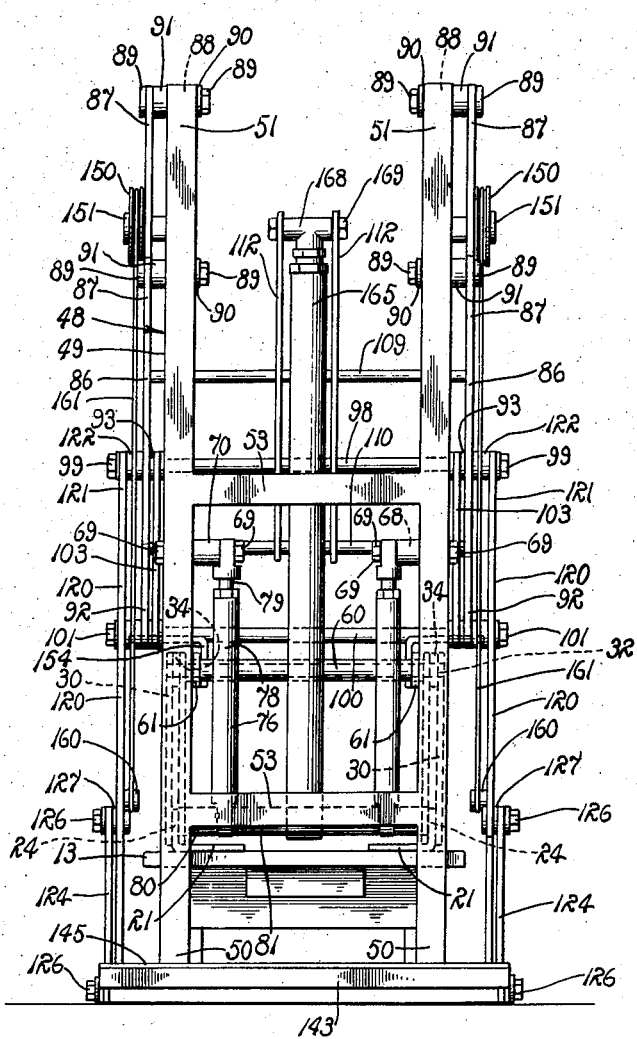
Fig. 4 is a rear elevation of the elevating apparatus as mounted on the truck of Fig. 2.

Laterally spaced pairs of upper and lower load carrying links 120 provide hinge ends 121 individually pivotally connected to the opposite ends of the upper and lower axles 109 and 110 outwardly of the mounting links 86 but inside of the heads 99 and 101. Washers 122 are fitted on the ends of the hinge members between the load carrying links and the mounting links so as to locate each pair of load carrying links in a vertical plane laterally outwardly spaced from the vertical plane of the mounting links on their respective sides of the vehicle 10. It is also to be observed, in Fig. 4 in particular, that whereas the vertical planes of the mounting links are substantially coincident with the side edges 16 of the bed 13, the planes of the load carrying links are spaced laterally outwardly of said side edges. The carrying links have carrying ends 123 respectively pivotally interconnected by end connecting bars or members 124. These bars space the carrying ends of the links 120 the same distance apart as the hinge ends 121 and the mast ends 87. Further, the connecting bars are parallel to the hinge bars 103 and the longitudinal members 49 of the mast 48. Preferably, the pivotal connection of the bars 124 to the links 120 is effected by pins 125 secured to the links and outwardly extended therethrough the bars. Heads 126 are provided on the pins on their opposite ends, and washers 127 are interposed the outer heads and the bars and also between the links and the bars.

From the foregoing, it will be evident that the mounting links 86, the mast members 49, and the hinge bars 103 constitute a primary or first parallelogram frame 135 mounted on the mast for elevational pivotal movement. The auxiliary support frame 108 also forms a part of another parallelogram frame including either the mast members 49 or the hinge bars 103, the mounting links, and, of course, the auxiliary frame. In addition, the hinge bars, the load carrying links 120, and the connecting bars 124 constitute a secondary parallelogram frame 136 connected to the primary parallelogram frame for elevational pivotal movement around a horizontal axis. Although only two such parallelogram frames have been illustrated, it will be apparent to those skilled in the art that the number of such frames could be multiplied as desired.

A U-shaped bracket 140 provides spaced parallel legs 141 rigidly connected to the lower ends of the bars 124, and a transversely extended center portion 142. A substantially rectangular load support platform 143 provides a longitudinally extended forward edge 144 connected to the center portion of the brackets by means of a hinge 145. The platform is thus mounted on the bracket for vertical pivotal movement around a horizontal axis disposed transversely of the vehicle 10.

Pulleys or sheaves 150 are individually pivotally mounted on the upper ends of the booms 111 by means of bolts 151 having nuts screw-threaded thereon. Lugs 154 are rigidly connected to ends of the support arms 61 which extend on the opposite side of the upper pivot rod 32 from the outer ends 62. The lugs project laterally outwardly of the support arms but are inside of the load carrying links 120. Bolts 155 are slidably extended through openings in the lugs and have upwardly disposed heads 156. Nuts 157 are screw-threaded on the ends of the bolts extended downwardly from the lugs. Compression springs 158 are fitted in circumscribing relation to the bolts and bear against the lugs and heads of the bolts. Eyelets 160 are individually connected to the lower load carrying links 120 of each pair of such links intermediate their ends 121 and 123 and on the inside surfaces thereof. Elongated flexible cables 161 are individually trained over the pulleys 150 and provide opposite ends respectively connected to the heads of the bolts and the eyelets. As will be apparent, the lower ends of the cables could be connected to the base in any manner, it being only required that they be relatively stationary with respect to the pulleys.

An elongated hydraulic lift ram 165 provides a cylinder 166 rigidly secured, as by welding, to the sleeve 60 intermediate its opposite ends, and a longitudinally reciprocal piston rod 167. A tubular portion 168 is connected to an upper end of the piston rod ends and is rotatably fitted on a pin 169 mounted in the upper ends of the beams 112 in substantially parallel relation to the pivotal axes of the parallelogram frames 135 and 136. Both the lifting rams and the tilt control rams 76 are connected to any suitable source of hydraulic power, not shown, for extending and contracting the rams.

*Operation of the first form*

The operation of the above described embodiment of the subject invention is believed to be readily apparent and is briefly summarized at this point.

Assuming that the mast 48 is in reclined position, as shown in Fig. 1, the vehicle 10 is driven to a location at which it is desired to elevate a load, not shown. The tilt control rams 76 are then retracted thereby to pivot the mast into erect position around the upper pivot rod 32. The lower end 50 of the mast extends downwardly from the rear edge 15 of the bed 13 in rested engagement with the ground. The load supporting platform 143 is then pivoted downwardly into a substantially horizontal position and loaded.

The lift ram 165 is then extended thus applying an upward force on the mounting links 86 or, stated otherwise, on the primary parallelogram frame 135, in forwardly spaced relation to the mast 48. This raises the mounting links, as will be evident. Upward movement of the mounting links also moves the auxiliary frame 108 upwardly thus lifting the load carrying links 120 or the secondary parallelogram frame 136 upwardly through the flexible cables 161. Upward movement of the mounting links causes the hinge ends 92 or 121 to move in vertical arcuate paths concentric to their respective pivotal connections to the mast. However, upward pivotal movement of the load carrying links causes the carrying ends 123 to move in vertical arcuate paths concentric to their respective hinge ends. Inasmuch as the arcuate paths of the hinge and carrying ends are oppositely curved, they tend to counteract each other. That is, whereas the mounting links tend to swing the load support platform 123 in a forwardly upwardly directed path, the load carrying links tend to move the platform in a rearwardly upwardly directed path. The resultant movement of the platform, therefore, is along a substantially vertical line rearwardly of the mast 48 and substantially parallel thereto.

Figure 2:
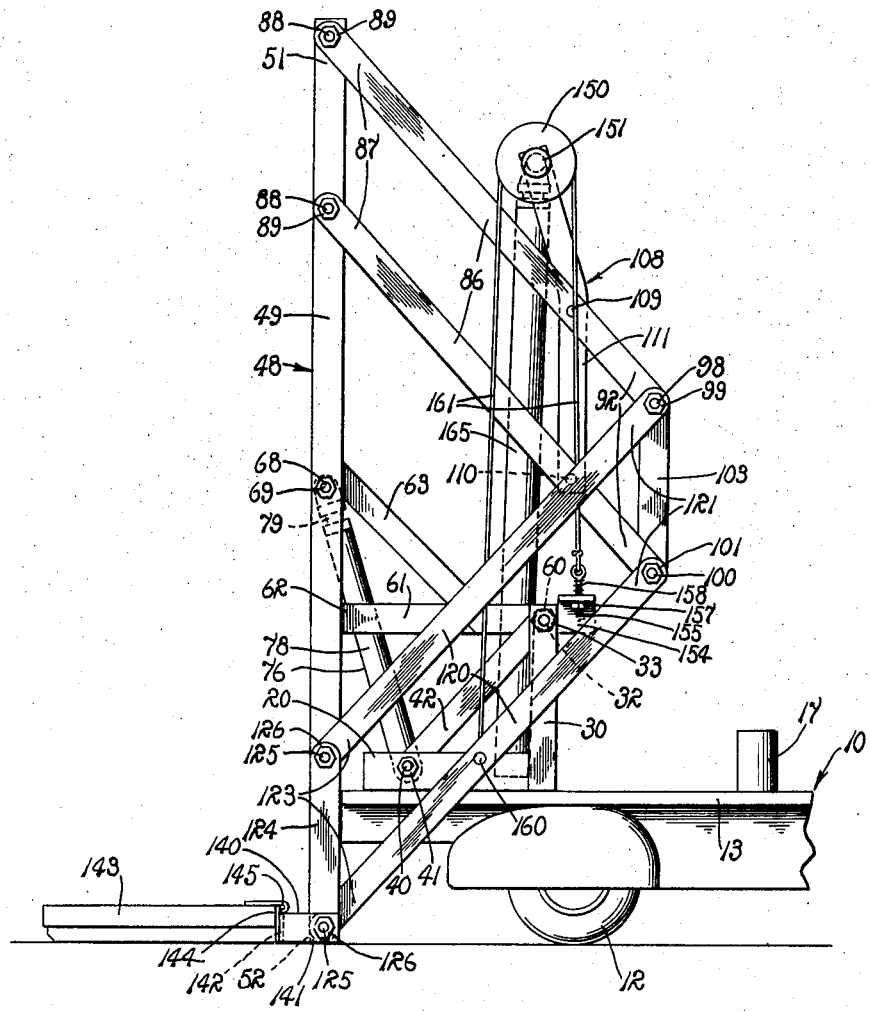
Fig. 2 is a fragmentary side elevation of the elevating apparatus and truck of Fig. 1 but with the elevating apparatus tilted into an operating position with load supporting forks thereof lowered to receive a load thereon.
Figure 3:
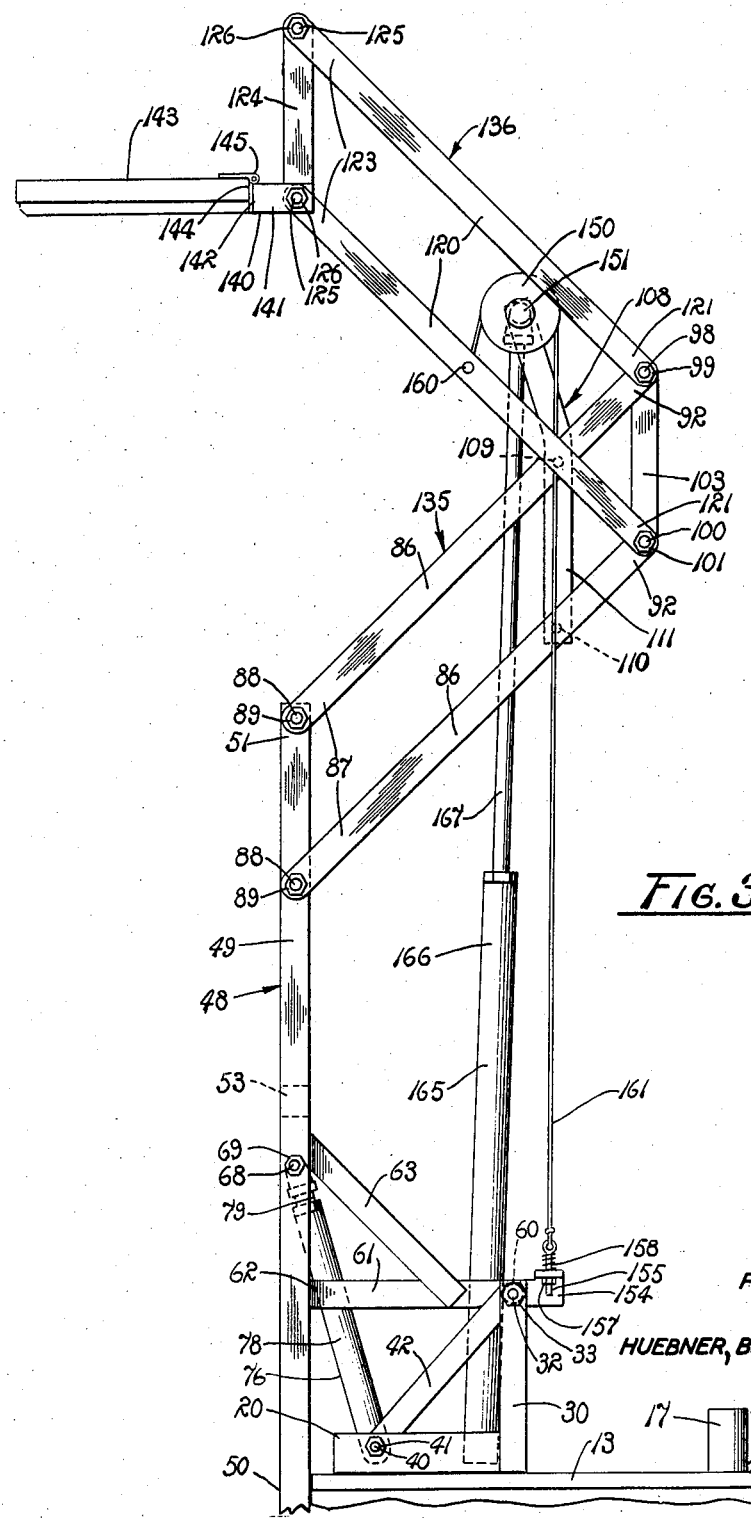
Fig. 3 is a side elevation of the apparatus in expanded, load elevating position.

When the lift ram 165 is fully extended, as seen in Fig. 3, the secondary parallelogram frame 136 is rearwardly upwardly extended from the primary frame 135 and supports the platform 143 considerably above the uppermost ends of the mast 48. Applying the principles of the present invention it is possible to elevate the platform to heights greater than twice the height of the mast on which the platform is supported, that is, the height of the apparatus in collapsed condition, as in Fig. 2. This has not been illustrated in Fig. 3 but it will be obvious that further extension of the lift ram 165 would lift the platform to greater heights, as desired. This is accomplished without binding or shearing forces of any appreciable size being applied to the mast, which forces are frequently encountered with conventional lifting apparatus. The primary wear in the described structure is in the bearings, or pins, which pivotally interconnect the parallelogram frames and the mast. These are easily repaired and/or replaced, as will be evident.

The platform 143 is lowered simply by contracting the ram 165. Although the ram is shown connected to an auxiliary frame 108 mounted on the primary parallelogram frame 135, it could just as well be connected to either the upper or lower hinge members 98 or 100 or, in fact, to any part of the primary parallelogram frame. Of course, greater mechanical advantage is had by connecting the upper end of the lifting ram to a point adjacent to the hinge ends of the parallelogram frames.

After the lifting tasks have been completed, the platform 143 is folded up against the mast 48, and the tilt rams 76 extended. This moves the mast and the parallelogram frames 135 and 136 into a reclined position extended forwardly over the vehicle 10 and with the upper hinge member 98 rested on the support block 17. Although not shown, it will be evident that the base on which the mast is mounted could be supported for swiveling or rotatable movement on the bed 13 about a vertical axis.

*Second form*

A second form of the subject invention is illustrated in Fig. 5 and includes a horizontal base 200 which can be mounted on the truck 10 of Fig. 1 or on any other suitable vehicle. A mast 201 provides a lower end 202 pivotally connected by pins, as 203, to the base and an upper end 204. A tilt control ram 205 pivotally interconnects the base and the mast in spaced relation to the pivot pins for tilting the mast around a horizontal axis defined by the pins and forwardly and rearwardly of the base.

Pairs of mounting links or side members 210 provide mast ends 211 individually pivotally connected in vertically spaced relation to the upper end 204 of the mast by pins 212 and 213. The mounting links also have extended hinge ends 214. Hinge connecting bars or end members 216 provide lower ends individually pivotally connected to the hinge ends of the lower mounting links by pins 218 and intermediate portions pivotally connected to the hinge ends of the upper mounting links by pins 217. The mounting links, the portion of the mast between the mounting links, and the portion of the hinge connecting the bars between the mounting links constitute a primary parallelogram frame 220.

Pairs of elongated rigid load carrying links or side members 225 provide hinge ends 226 individually pivotally connected to the intermediate and upper end portions of the hinge connecting bars. The hinge ends of the lower load carrying links are pivotally connected to the pins 217 outwardly of the upper mounting links, and the hinge ends of the upper load carrying links are pivotally connected to the hinge connecting bars by pins 227. The load carrying links have oppositely extended load ends 228.

An L-shaped load support 235 includes an upright load connecting link 236 pivotally connected to the load ends 228 of the load carrying links 225 by means of pins 237. The load support also provides a pair of outwardly extended forks 238 rigidly interconnected by a crossbar 239. An eyebolt 240 is extended through the crossbar and has a nut 241 screw-threaded thereon. The load carrying links, the portion of the hinge connecting bars 216 between the load carrying links, and the rod connecting link 236 constitute a secondary parallelogram frame 245.

An upper arcuate boom or bracket 250 provides a lower end 251 rigidly secured to the hinge connecting bars 216 and an upper rearwardly extended end 252 terminating adjacent to the load ends 228 of the load carrying links 225. A pair of pulleys or sheaves 253 is rotatably mounted on the upper end of the boom on a horizontal axle member 254.

An elongated lift ram 260 provides a cylinder 261 having a lower end pivotally connected to the base 200 by means of a horizontal pin 262. It will be evident that the ram optionally may be connected to pin 203, if desired. The ram also has a reciprocating piston rod 263 having an upper end pivotally connected to the upper end 252 of the boom 250. A lug 265 is secured, as by welding, to the forward side of the cylinder, and eyebolts 266 are screw-threaded downwardly through the lug. Nuts 267 are screw-threaded on the lower ends of the eyebolts; and cables 268 have lower ends individually connected to the eyebolts 266, opposite ends individually connected to the eyebolts 240, and intermediate portions trained over the pulleys 253.

*Operation of the second form*

The operation of the second form of the subject invention is quite similar to the first form, described above. With the apparatus in collapsed condition, as shown in dashed lines in Fig. 5, the tilt ram 205 is expanded or contracted to vary the angle of the mast 201 with respect to the base 200. Preferably, the mast is positioned so that the lift forks 238 are substantially horizontal.

The lift ram 260 is then expanded to apply upward force on the end 252 of the boom 250. This pivots the primary parallelogram frame 220 around the pins 212 and 213 inasmuch as the upward force of the ram is applied through the boom 250 to the hinge end of the primary parallelogram frame.

As the lift ram 260 raises the boom 250, the pulleys 253 raise the lift forks 239 through the cables 268. Inasmuch as the lift forks are a part of the secondary parallelogram frame 245, the latter is pivoted around its hinge end 226 in an upward arc. As with the first form of the invention, the pivoting arcs of the primary and secondary parallelogram frames are substantially equal and opposite so that the resultant path of the lift forks is substantially vertical.

Having considered both the first and second forms of the invention, it will be evident that the primary lifting force represented by the hydraulic rams 165 and 260 may be applied in a variety of places. Generally, however, this force must be applied to the secondary parallelogram frame 126 or 245 or some member rigidly associated with the secondary parallelogram frame. The advantage of applying the lifting force adjacent to the hinge ends of the rams, as in the first form of the invention, is that a shorter stroke of the ram may be utilized to effect full expansion of the frames. However, inasmuch as the secondary parallelogram frame must bear a greater portion of the load, the materials employed must have greater strength. In contrast where the lifting force is applied closer to the load end of the secondary parallelogram frame, the stroke of the ram must be greater to achieve the heights desired. In this instance, however, less of the load is borne by the links of the parallelogram frame while more of the load is imposed on the ram. Accordingly, with the second form of the invention, lighter materials can be utilized for the parallelogram frames.

In commercial embodiments of the subject invention, the lifting apparatus weighs only approximately 400 pounds as compared to one ton for lifting apparatus of the prior art employing the above described slide members. When mounted on a vehicle 10, the lifting apparatus is approximately 8 feet wide. Further, such commercial embodiment provides a mast which is approximately 15 feet high and is constructed to move the platform 143, on the forks 238, to a height of approximately 30 feet. For highway travel, with the mast reclined, the maximum height is approximately 10 feet. The apparatus has been found useful for the usual tasks of industrial trucks and similar lifting apparatus, in well rigs, for telephone and power line work, and the like. The load supporting means could take the form of a pair of lifting forks, a grain hopper, a cement bucket, or various other devices in place of the platform. It is therefore readily apparent that the lifting apparatus of the subject invention not only is highly effective in operation but also is adapted for a wide variety of uses.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An elevating apparatus comprising a base, a mast mounted in a substantially erect position on the base, a first pair of elevationally spaced links pivotally mounted on the mast and laterally extended therefrom, an end member pivotally interconnecting the links in substantially parallel relation for movement of the links relative thereto about substantially horizontal axes lying in a substantially erect plane, a second pair of elevationally spaced links pivotally connected to the end member and laterally extended therefrom to the same side thereof as the mast, load support means having a substantially erect portion pivotally interconnecting the extended ends of the second pair of spaced links with the links in substantially parallel relation, said links being elevationally pivotal about substantially horizontal axes lying in a substantially erect plane parallel to said plane of the axes of the end member, a sheave, means mounting the sheave on the first links in elevationally spaced relation thereabove, a flexible tension member extended over the sheave having an end connected to the second links and an opposite end anchored in fixed relation to the mast, and means for controllably raising and lowering the sheave.

2. A lifting apparatus comprising a base; a mast upwardly extended from the base; a pair of upper and lower vertically spaced parallel mounting links having mast ends pivotally connected in vertically spaced relation to the mast and oppositely extended hinge ends; a rigid hinge bar pivotally interconnecting the hinge ends of the mounting links in parallel relation to the mast; a pair of upper and lower vertically spaced parallel load carrying links of substantially the same length as the mounting links having hinge ends pivotally connected to the hinge bar respectively on the same axes as the upper and lower mounting links but laterally thereof, and load ends; a load connecting bar pivotally interconnecting the load ends of the carrying links and being in substantially parallel relation to the mast and to the hinge bar, the load ends of the carrying links being adapted to support a load outwardly therefrom, the mounting and load carrying links being extended on the same side of the hinge bar, and the links being elevationally pivotal on substantially horizontal axes; an elongated boom pivotally interconnecting the mounting links in spaced parallel relation to the mast and the hinge bar and upwardly extended therefrom; an elongated beam; means rigidly connecting the beam to the boom in laterally spaced relation thereto; a pulley rotatably mounted on the boom for rotation around an axis substantially parallel to the pivotal axes of the links; a cable trained over the pulley and having opposite ends respectively connected to one of the carrying links and to the base; and an hydraulic ram pivotally interconnecting the base and the beam for elevationally moving the hinge ends of the mounting links relative to the mast at a predetermined velocity and for elevationally moving the hinge ends of the load carrying links relative to the hinge bar at substantially the same velocity as said predetermined velocity.

3. A lifting apparatus comprising a base; a mast upwardly extended from the base; a pair of upper and lower vertically spaced substantially parallel mounting links having mast ends pivotally connected in vertically spaced relation to the mast and oppositely extended hinge ends; a rigid hinge bar having a lower portion pivotally interconnecting the hinge ends of the mounting links and in spaced substantially parallel relation to the mast and an upper portion; a pair of upper and lower vertically spaced substantially parallel load carrying links having hinge ends and oppositely extended load ends; the hinge end of the lower carrying link being pivotally connected to the hinge bar on a common axis with the hinge end of the upper mounting link and the hinge end of the upper carrying link being pivotally connected to the upper portion of the hinge bar in upwardly spaced relation to said common axis and so that said common axis is between the pivot axes of the upper carrying link and the lower mounting link, the mounting links being of substantially the same length and being spaced substantially the same distance apart as the carrying links; a load connecting bar pivotally interconnecting the load ends of the carrying links in substantially parallel relation to the mast and to the hinge bar, the load ends of the carrying links being adapted to support a load outwardly therefrom, the mounting and load carrying links being extended on the same side of the hinge bar, and the links being elevationally pivotal on substantially horizontal axes; an elongated boom rigidly connected to the hinge bar and upwardly extended therefrom toward the mast; a pulley rotatably mounted on the boom for rotation around an axis substantially parallel to the pivotal axis of the links; a cable trained over the pulley and having opposite ends; means connecting one end of the cable to the load ends of the carrying links; an hydraulic ram having telescoping portions respectively pivotally connected to the base and to the boom adjacent to the pulley; and means connecting the opposite end of the cable to the portion of the ram connected to the base.

4. An elevating apparatus comprising a base; a pair of parallelogram frames each having opposite end members and opposite side members, the side members of the frames being of substantially the same length and being pivotally connected to the end members of their respective frames for skewing of the frames about substantially horizontal axes, the frames having a common end member with the side members of the frames extended to the same side of the common end member, and the frames also having substantially parallel opposite end members; means rigidly mounting one of said opposite end members on the base; load support means borne by the other of said opposite end members; a sheave mounted on the frame which is mounted on the base in spaced relation to said opposite end member thereof; a cable having one end anchored in substantially fixed relation to the base, extended over the sheave, and connected to the frame whose said opposite end member bears the load support means at a position in spaced relation to its said opposite end member; and powered means operably associated with the frame which mounts the sheave skewably to raise and to lower the same whereby the cable and sheave imparts corresponding elevational skewing movement to the other frame so that the load support means is elevationally adjusted in a substantially straight line.

5. In an elevating apparatus, a support; a first end member rigidly mounted on the support; a first pair of elongated, transversely spaced, substantially parallel side members having mounted ends individually pivotally connected to the first end member in transversely spaced relation to each other for elevational pivotal movement about substantially horizontal axes and having oppositely extended ends; an intermediate end member pivotally interconnecting the extended ends of the first pair of side members; a second pair of elongated, transversely spaced, substantially parallel side members having mounted ends individually pivotally connected to the intermediate end member in transversely spaced relation to each other for elevational pivotal movement and opposite ends outwardly extended on the same side of the intermediate end member as the first side member; a second end member pivotally interconnecting the extended ends of the second pair of side members, the pivot axes of all of the end and side members being in substantially parallel relationship to each other, the first and second end members being substantially parallel to each other and to the intermediate end member, the first end member, the first side members and the intermediate member constituting a first parallelogram frame, and the second end member, the second side members and the intermediate member constituting a second parallelogram frame whereby the intermediate end member is common to both frames; means connected to both of said frames for correspondingly raising and lowering the first side members relative to the first end member and the second side members relative to the intermediate end member thereby elevationally to move the second end member in a substantially rectilinear path, said raising and lowering means including an auxiliary member connected to the first frame, powered means connected to the auxiliary member for elevationally moving the first frame thereby to move the extended ends of the first pair of side members in a substantially vertical arcuate path, an elongated flexible member having an end portion connected to the second frame and an opposite end portion connected to the elevationally adjusting means, and means borne by the auxiliary member engaging the flexible member intermediate its end portions for raising and lowering, through the flexible member, the outwardly extended ends of the second side members in a substantially vertical arcuate path curved oppositely relative to the path of the extended ends of the first side members and about their respective pivotal connections to the intermediate end member whereby the second end member travels elevationally in a substantially rectilinear path.

6. In an elevating apparatus, a support; a first end member rigidly mounted on the support; a first pair of elongated, transversely spaced, substantially parallel side members having mounted ends individually pivotally connected to the first end member in transversely spaced relation to each other for elevational pivotal movement about substantially horizontal axes and having oppositely extended ends; an intermediate end member pivotally interconnecting the extended ends of the first pair of side members; a second pair of elongated, transversely spaced, substantially parallel side members having mounted ends individually pivotally connected to the intermediate end member in transversely spaced relation to each other for elevational pivotal movement and opposite ends outwardly extended on the same side of the intermediate end member as the first side member; a second end member pivotally interconnecting the extended ends of the second pair of side members, the pivot axes of all of the end and side members being in substantially parallel relationship to each other, the first and second end members being substantially parallel to each other and to the intermediate end member, the first end member, the first side members and the intermediate member constituting a first parallelogram frame, and the second end member, the second side members and the intermediate member constituting a second parallelogram frame whereby the intermediate end member is common to both frames; means connected to both of said frames for correspondingly raising and lowering the first side members relative to the first end member and the second side members relative to the intermediate end member thereby elevationally to move the second end member in a substantially rectilinear path, said raising and lowering means including a bracket mounted on the first frame, a sheave rotatably mounted on the bracket and positioned between the intermediate end member and the first end member, flexible tension means extended over the sheave having an end operably connected to the second frame and an opposite end anchored in substantially fixed relation to the support, and extendible and retractable powered means mounted on the support and connected to the bracket for raising and lowering the bracket with respect to the support correspondingly to raise and lower the sheave.

7. The elevating apparatus of claim 1 wherein the raising and lowering means is an hydraulic ram having opposite end portions slidably interfitted for expansion and contraction and respectively pivotally connected to the base and to the first frame for elevationally moving the first frame incident to said expansion and contraction.

8. In a lifting apparatus comprising a base; a mast mounted on the base and upwardly extended therefrom; laterally spaced pairs of elongated, longitudinally rigid, upper and lower mounting links having mast ends respectively pivotally connected to the mast with the links of each pair in substantially equally vertically spaced relation, and oppositely extended hinge ends; laterally spaced pairs of elongated, longitudinally rigid, upper and lower load carrying links of substantially the same length as the mounting links and having hinge ends and oppositely extended carrying ends; means individually pivotally interconnecting the hinge ends of the mounting and load carrying links with the ends of each pair of links vertically spaced substantially the same distance apart as the pivotal connections of the mounting links on the mast, the mounting links being supported on the mast for elevationally pivotal movement around substantially horizontal axes and in substantially vertical planes, the load carrying links being connected to the mounting links for elevational pivotal movement around substantially horizontal axes and in substantially vertical planes laterally spaced with respect to the planes of the mounting links, both the mounting links and the carrying links being extended from said hinge ends toward the mast; rigid end bars individually pivotally interconnecting the carrying ends of each pair of carrying links in substantially parallel relation to the mast and spacing said carrying ends substantially the same distance apart as said pivotal connections of the mounting links on the mast; load supporting means connected to the carrying ends of the carrying links; first means connected to the mounting links for elevationally adjusting such links thereby to move the hinge ends in a substantially vertical arcuate path; second means connected to the load carrying links and to said first means operable incident to elevational movement of the mounting links for correspondingly moving said carrying ends simultaneously with said hinge ends and in an arcuate path curved oppositely relative to said path of the hinge ends whereby the load supporting means is elevationally adjusted in a substantially straight line, said first and second means including a sheave, means rotatably mounting the sheave on the mounting links for rotation about an axis substantially parallel to said horizontal axes, an elongated flexible cable trained over the sheave having an end connected to the base and an opposite end connected to one of the load carrying links, and an hydraulic ram adapted for extension and retraction and having opposite end portions respectively pivotally connected to the base and to the mounting links for elevationally moving the hinge ends of the mounting links relative to the mast, the cable being thereby elevationally moved by the sheave for elevationally moving the extended ends of the load carrying links with respect to their hinge ends and at a velocity substantially equal to the velocity of movement of the hinge ends of the mounting links.

9. In an elevating apparatus, a support; a first end member rigidly mounted on the support; a first pair of elongated, transversely spaced, substantially parallel side members having mounted ends individually pivotally connected to the first end member in transversely spaced relation to each other for elevational pivotal movement about substantially horizontal axes and having oppositely extended ends; an intermediate end member pivotally interconnecting the extended ends of the first pair of side members; a second pair of elongated, transversely spaced, substantially parallel side members having mounted ends individually pivotally connected to the intermediate end member in transversely spaced relation to each other for elevational pivotal movement and opposite ends outwardly extended on the same side of the intermediate end member as the first side member; a second end member pivotally interconnecting the extended ends of the second pair of side members, the pivot axes of all of the end and side members being in substantially parallel relationship to each other, the first and second end members being substantially parallel to each other and to the intermediate end member, the first end member, the first side members and the intermediate member constituting a first parallelogram frame, and the second end member, the second side members and the intermediate member constituting a second parallelogram frame whereby the intermediate end member is common to both frames; means connected to both of said frames for correspondingly raising and lowering the first side members relative to the first end member and the second side members relative to the intermediate end member thereby elevationally to move the second end member in a substantially rectilinear path, said raising and lowering means include an auxiliary member connected to the first frame, powered means connected to the auxiliary member for elevationally moving the first frame thereby to move the extended ends of the first pair of side members in a substantially vertical arcuate path, an elongated flexible member having an end portion connected to the second frame and an opposite end portion connected to the support, and means borne by the auxiliary member engaging the flexible member intermediate its end portions for raising and lowering, through the flexible member, the outwardly extended ends of the second side members in a substantially vertical arcuate path curved oppositely relative to the path of the extended ends of the first side members and about their respective pivotal connections to the intermediate end member whereby the second end member travels elevationally in a substantially rectilinear path.

10. An elevating apparatus comprising a base; a pair of paralleogram frames each having opposite end members and opposite side members, the side members of the frames being of substantially the same length and being pivotally connected to the end members of their respective frames for skewing of the frames about substantially horizontal axes, the frames having a common end member with the side members of the frames extended to the same side of the common end member, and the frames also having substantially parallel opposite end members; means mounting one of said opposite end members on the base; load supporting means borne by the other of said opposite end members; a sheave mounted on the frame which is mounted on the base in spaced relation to said opposite end member thereof; a cable having one end anchored in substantially fixed relation to the base extended over the sheave, and connected to the frame which is mounted on the base; and powered means operably associated with the frame which mounts the sheave skewable to raise and to lower the same whereby the cable and sheave imparts corresponding elevational skewing movement to the other frame so that the load support means is elevationally adjusted in a substantially straight line.

References Cited in the file of this patent

UNITED STATES PATENTS

| | | |
|---|---|---|
| 521,256 | Browne | June 12, 1894 |
| 2,349,353 | Johnson | May 23, 1944 |
| 2,411,966 | Hogan | Dec. 3, 1946 |
| 2,500,815 | Gerli | Mar. 14, 1950 |
| 2,672,377 | Werner | Mar. 16, 1954 |
| 2,674,500 | Hukari | Apr. 6, 1954 |
| 2,707,063 | Gran | Apr. 26, 1955 |
| 2,849,132 | Clarke | Aug. 26, 1958 |